United States Patent
Kato et al.

(10) Patent No.: US 11,440,550 B2
(45) Date of Patent: Sep. 13, 2022

(54) VEHICLE CONTROL DEVICE AND VEHICLE CONTROL METHOD

(71) Applicant: HONDA MOTOR CO., LTD, Tokyo (JP)

(72) Inventors: Daichi Kato, Wako (JP); Mo Zhang, Wako (JP); Chihiro Oguro, Wako (JP); Nozomu Hirosawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/190,008

(22) Filed: Mar. 2, 2021

(65) Prior Publication Data

US 2021/0276559 A1   Sep. 9, 2021

(30) Foreign Application Priority Data

Mar. 4, 2020   (JP) .............................. JP2020-036604

(51) Int. Cl.
*B60W 30/18* (2012.01)
*B60W 40/06* (2012.01)
*B60W 30/14* (2006.01)

(52) U.S. Cl.
CPC .... *B60W 30/18163* (2013.01); *B60W 30/143* (2013.01); *B60W 40/06* (2013.01)

(58) Field of Classification Search
CPC .. B60W 2520/10; B60W 40/06; B60W 10/20; B60W 30/143; B60W 30/18163
USPC .......................................................... 701/23
See application file for complete search history.

(56) References Cited

U.S. PATENT DOCUMENTS

| | | | |
|---|---|---|---|
| 2016/0046290 A1* | 2/2016 | Aharony | B60W 30/0953 701/41 |
| 2017/0227966 A1* | 8/2017 | Monzen | B62D 15/0255 |
| 2017/0270798 A1* | 9/2017 | Ushiba | G08G 1/161 |
| 2018/0047292 A1 | 2/2018 | Hashimoto et al. | |
| 2018/0113450 A1* | 4/2018 | Sherony | B60W 40/04 |
| 2019/0135281 A1* | 5/2019 | Miura | B60W 10/184 |
| 2019/0235510 A1 | 8/2019 | Hashimoto et al. | |
| 2019/0347939 A1* | 11/2019 | Kim | B60K 35/00 |
| 2019/0367021 A1* | 12/2019 | Zhao | B60W 60/0011 |
| 2019/0367022 A1* | 12/2019 | Zhao | B60W 30/18154 |

(Continued)

FOREIGN PATENT DOCUMENTS

| | | | | |
|---|---|---|---|---|
| CN | 104029676 A | * | 9/2014 | ............. B60T 7/042 |
| CN | 108509832 A | * | 9/2018 | ............ B60W 30/00 |

(Continued)

OTHER PUBLICATIONS

Office Action dated Jun. 1, 2021 issued over the corresponding Japanese Patent Application No. 2020-036604 with the English translation of the pertinent portion.

*Primary Examiner* — Atul Trivedi
(74) *Attorney, Agent, or Firm* — Carrier Blackman & Associates, P.C.; Joseph P. Carrier; Jeffrey T. Gedeon (57) ABSTRACT

On a road on which a first lane, a second lane, and a third lane or a road shoulder are adjacent to each other, a vehicle control device executes an automatic lane change from the first lane to the second lane. In the case that a traffic regulating object that regulates passage of traffic in the third lane or on the road shoulder is placed in the third lane or on the road shoulder, and an external environment recognition unit recognizes the traffic regulating object, a lane change control unit restricts the automatic lane change.

15 Claims, 6 Drawing Sheets

(56) References Cited

U.S. PATENT DOCUMENTS

| | | | |
|---|---|---|---|
| 2019/0369616 A1* | 12/2019 | Ostafew | G05D 1/0088 |
| 2019/0369626 A1* | 12/2019 | Lui | G05D 1/0221 |
| 2020/0097010 A1* | 3/2020 | Maila | B60W 60/0011 |
| 2020/0122773 A1* | 4/2020 | Deshpande | B60T 7/12 |
| 2020/0180633 A1* | 6/2020 | Wu | B60W 30/18163 |
| 2020/0180638 A1 | 6/2020 | Kanoh | |
| 2020/0283021 A1* | 9/2020 | Horii | B60K 28/14 |
| 2020/0307569 A1* | 10/2020 | Yasui | G06V 20/58 |
| 2021/0209941 A1* | 7/2021 | Maheshwari | G06V 10/426 |

FOREIGN PATENT DOCUMENTS

| | | | | |
|---|---|---|---|---|
| CN | 108528456 A | * | 9/2018 | B60W 30/12 |
| DE | 102017129517 A1 | * | 6/2018 | B60Q 1/346 |
| DE | 102018107341 A1 | * | 10/2018 | B60K 35/00 |
| DE | 102018107502 A1 | * | 10/2018 | B60K 35/00 |
| JP | 2015-175824 A | | 10/2015 | |
| JP | 2018-025976 A | | 2/2018 | |
| JP | 2019-131107 A | | 8/2019 | |
| WO | 2018/216194 A1 | | 11/2018 | |

\* cited by examiner

VEHICLE CONTROL DEVICE AND VEHICLE CONTROL METHOD

CROSS-REFERENCE TO RELATED APPLICATION

This application is based upon and claims the benefit of priority from Japanese Patent Application No. 2020-036604 filed on Mar. 4, 2020, the contents of which are incorporated herein by reference.

BACKGROUND OF THE INVENTION

Field of the Invention

The present invention relates to a vehicle control device and a vehicle control method configured to execute an automatic lane change.

Description of the Related Art

In recent years, there have been developed a driving assisted vehicle in which portions of a travel control of a user's own vehicle are executed regardless of the intention of the driver, and an automatically driven vehicle in which the entirety of the travel control of the user's own vehicle is executed regardless of the intention of the driver. Driving assistance and automated driving are possible for cases in which it is easy to make a judgment of the situation on the side of the vehicle, but are not possible for cases in which it is difficult to make a judgment of the situation on the side of the vehicle. In Japanese Laid-Open Patent Publication No. 2015-175824, an automated driving assist system is disclosed in which a determination is made as to whether or not, in an automated driving section, automated driving in such a section is possible in consideration of traffic information.

SUMMARY OF THE INVENTION

On a road on which a first lane, a second lane, and a third lane or a road shoulder are adjacent to each other, a traffic regulating object (pylons, smoke candles, or the like) may be placed in the third lane or on the road shoulder. In such a situation, there is a possibility that traffic in the second lane may be regulated beyond a location where the traffic regulating object is placed. When the user's own vehicle encounters the traffic regulating object in the second lane after having made a lane change from the first lane to the second lane, the user's own vehicle must return again to the first lane. However, at that stage, there is a possibility that the first lane may be already congested, and it may become difficult for the user's own vehicle to return to the first lane.

The present invention has been devised taking into consideration the aforementioned problems, and has the object of providing a vehicle control device and a vehicle control method in which it is possible to select an appropriate lane in a situation in which a traffic regulating object has been placed.

One aspect of the present invention is characterized by a vehicle control device, comprising:

an external environment recognition unit configured to recognize a situation of a surrounding periphery of a user's own vehicle; and a lane change control unit configured to execute an automatic lane change by controlling a travel speed and steering of the user's own vehicle, based on a recognition result of the external environment recognition unit;

wherein, on a road on which a first lane, a second lane, and a third lane or a road shoulder are adjacent to each other, the automatic lane change is executed from the first lane to the second lane; and in the case that a traffic regulating object that regulates passage of traffic is placed in the third lane or on the road shoulder, and the external environment recognition unit recognizes the traffic regulating object, the lane change control unit restricts the automatic lane change.

Another aspect of the present invention is characterized by a vehicle control method, comprising:

an external environment recognition step of recognizing a situation of a surrounding periphery of a user's own vehicle; and a lane change control step of executing an automatic lane change by controlling a travel speed and steering of the user's own vehicle, based on a recognition result of the external environment recognition step;

wherein, on a road on which a first lane, a second lane, and a third lane or a road shoulder are adjacent to each other, the automatic lane change is executed from the first lane to the second lane; and in the case that a traffic regulating object that regulates passage of traffic is placed in the third lane or on the road shoulder, and the traffic regulating object is recognized in the external environment recognition step, in the lane change control step, the automatic lane change is restricted.

According to the present invention, it is possible to select an appropriate lane in a situation in which the traffic regulating object has been placed.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE PREFERRED EMBODIMENTS

Preferred embodiments of a driving control device and a driving control method according to the present invention will be presented and described in detail below with reference to the accompanying drawings.

[1. Configuration of Vehicle Control Device 10]

Figure 1:
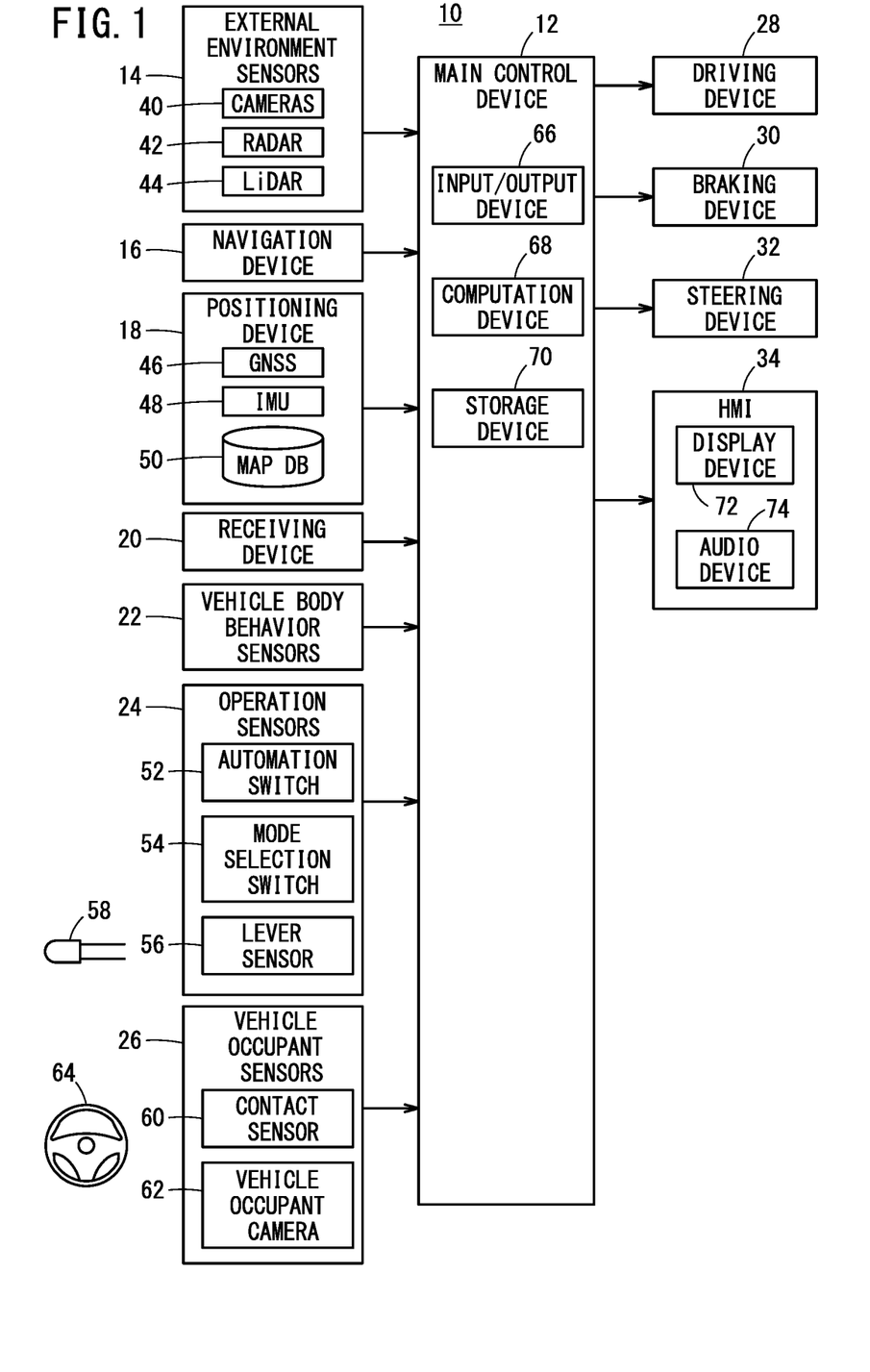
FIG. 1 is a block diagram of a vehicle control device.

A vehicle control device 10 will now be described with reference to FIG. 1. The vehicle control device 10 is provided in a user's own vehicle 120 (see FIG. 3). The vehicle control device 10 includes a so-called driving assist function that controls the travel speed and steering of the user's own vehicle 120 regardless of the intention of the driver.

The vehicle control device 10 includes a main control device 12, an input device group that inputs various information to the main control device 12, and an output device group that operates the user's own vehicle 120 based on various information output by the main control device 12. Within the input device group, there are included external environment sensors 14, a navigation device 16, a positioning device 18, a receiving device 20, vehicle body behavior sensors 22, operation sensors 24, and vehicle occupant sensors 26. Within the output device group, there are included a driving device 28, a braking device 30, a steering device 32, and an HMI (Human Machine Interface) 34.

[1.1. Configuration of Input Device Group]

The external environment sensors 14 include a plurality of cameras 40, a plurality of radar devices 42, and a plurality of LiDAR devices 44. The cameras 40 capture images of the surrounding environment of the user's own vehicle 120, and output image information to the main control device 12. The radar devices 42 and the LiDAR devices 44 detect targets around the periphery of the user's own vehicle 120, and output detected information to the main control device 12.

The navigation device 16 measures the position of the user's own vehicle 120 using GPS, and generates a planned travel route from the position of the user's own vehicle 120 to a destination designated by the driver. The navigation device 16 outputs route information indicating the planned travel route that was generated to the main control device 12.

The positioning device 18 includes a GNSS (Global Navigation Satellite System) 46, an IMU (Inertial Measurement Unit) 48, and a map DB (map database) 50. The positioning device 18 measures the position of the user's own vehicle 120 using the GNSS 46 and the IMU 48, and outputs user's own vehicle position information indicating the position of the user's own vehicle 120 to the main control device 12. Further, the positioning device 18 outputs the map information that is stored in the map DB 50 to the main control device 12. Moreover, the map information stored in the map DB 50 is of higher accuracy than the map information stored in the navigation device 16, and includes various additional information (such as information in lane units, and the like).

The receiving device 20 includes first to third reception terminals (not shown). The first reception terminal receives wide area information broadcast by a broadcasting station. The second reception terminal receives local information transmitted by roadside units installed alongside a road 130 (see FIG. 3). The third reception terminal receives other vehicle information transmitted by other vehicles 122 (see FIG. 3). The first to third reception terminals output various types of received information to the main control device 12.

The vehicle body behavior sensors 22 include respective sensors for measuring behaviors (travel speed, acceleration/deceleration, yaw rate, etc.) of the user's own vehicle 120. The respective sensors output various types of detected information to the main control device 12.

The operation sensors 24 include an automation switch 52, a mode selection switch 54, and a lever sensor 56. In accordance with a switching operation performed by the driver, the automation switch 52 outputs to the main control device 12 instruction information to instruct that automation or cancellation of automation of either the travel speed or steering be carried out. In accordance with a switching operation performed by the driver, the mode selection switch 54 outputs to the main control device 12 selection information indicating which one of a plurality of driving modes (see item [2] below) has been selected. The lever sensor 56 detects an operated position of a turn signal (blinker) lever 58, and outputs operated position information indicating the operated position of the turn signal lever 58 to the main control device 12. Further, the operation sensors 24 include various sensors that detect operated amounts of operating elements (an accelerator pedal, a brake pedal, and a steering wheel 64).

The vehicle occupant sensors 26 include a contact sensor 60, and a vehicle occupant camera 62. The contact sensor 60 is a capacitance sensor or a pressure sensor provided on the steering wheel 64. The contact sensor 60 detects a gripping state (contact state) of the driver with respect to the steering wheel 64, and outputs the detected information to the main control device 12. The vehicle occupant camera 62 captures images of the driver, and outputs image information to the main control device 12.

[1.2. Configuration of Main Control Device 12]

The main control device 12 is configured by an ECU. The main control device 12 includes an input/output device 66, a computation device 68, and a storage device 70. The input/output device 66 includes an A/D conversion circuit and a communication interface. The computation device 68 includes a processor such as a CPU. The computation device 68 realizes various functions by executing programs stored in the storage device 70. A description will be given in item [1.4] below concerning the various functions of the computation device 68. The storage device 70 includes a RAM, a ROM, and the like. The storage device 70 stores various programs, and numerical information such as threshold values and the like that are used in processes performed by the computation device 68.

[1.3. Configuration of Output Device Group]

The driving device 28 includes a driving force output ECU, and control targets (none of which are shown) of the driving force output ECU. The driving device 28 adjusts the driving force in accordance with instruction information (driving instructions) output by the main control device 12.

The braking device 30 includes a brake ECU, and control targets (none of which are shown) of the brake ECU. The braking device 30 adjusts the braking force in accordance with instruction information (braking instructions) output by the main control device 12.

The steering device 32 includes an EPS (Electric Power Steering) ECU, and control targets (none of which are shown) of the EPS ECU. The steering device 32 adjusts a steering amount in accordance with instruction information (steering instructions) output by the main control device 12.

The HMI 34 includes a display device 72 and an audio device 74. The display device 72 outputs images in accordance with instruction information (notification instructions) output by the main control device 12. The audio device 74 outputs audio by way of voice in accordance with instruction information (notification instructions) output by the main control device 12.

[1.4. Various Functions of the Computation Device 68]

Figure 2:
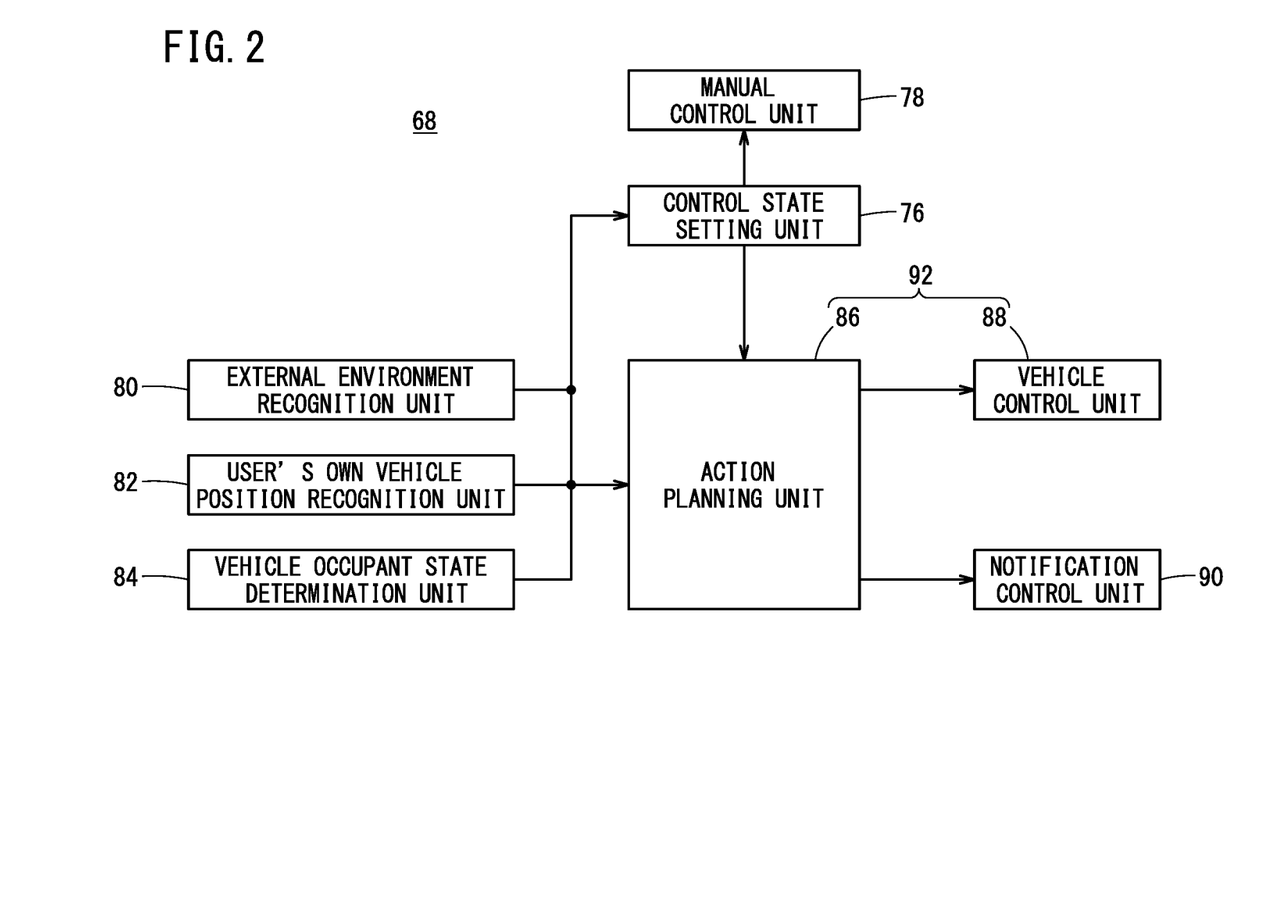
FIG. 2 is a functional block diagram of a computation device.

The various functions realized by the computation device 68 will be described with reference to FIG. 2. The computation device 68 functions as a control state setting unit 76, a manual control unit 78, an external environment recognition unit 80, a user's own vehicle position recognition unit 82, a vehicle occupant state determination unit 84, an action planning unit 86, a vehicle control unit 88, and a notification control unit 90. The action planning unit 86 and the vehicle control unit 88 are collectively referred to as a lane change control unit 92.

The control state setting unit 76 determines, in accordance with an operation performed using the automation switch 52, whether to execute various travel controls (control of the travel speed and control of steering) by either one of a manual control or an automatic control. Further, the control state setting unit 76 determines a degree of automation of the travel control. For example, the control state setting unit 76 selects and sets, from among the plurality of driving modes, the degree of automation to be used. Concerning driving modes executed in the present embodiment, a description thereof will be described in item [2] below.

The manual control unit 78 performs a travel control in relation to the manual control in accordance with the operated amounts of the operation elements (the accelerator pedal, the brake pedal, and the steering wheel 64) output by the operation sensors 24. The manual control unit 78 outputs instruction information (driving instructions, braking instructions, steering instructions) in relation to the manual control to the driving device 28, the braking device 30, and the steering device 32.

The external environment recognition unit 80 recognizes the situation occurring around the periphery of the user's own vehicle 120, on the basis of the image information and the detected information output by the external environment sensors 14. The user's own vehicle position recognition unit 82 recognizes the position of the user's own vehicle 120, on the basis of the map information and the user's own vehicle position information output by the positioning device 18. The vehicle occupant state determination unit 84 determines the gripping state of the driver (whether or not there is contact made) with respect to the steering wheel 64, on the basis of the detected information output by the contact sensor 60. Further, the vehicle occupant state determination unit 84 recognizes the surrounding monitoring state of the driver (whether or not the driver is looking forward, or whether or not the eyes are open), on the basis of the image information output by the vehicle occupant camera 62.

The action planning unit 86 creates an action plan in relation to the automatic control, on the basis of the recognition result of the external environment recognition unit 80, and the recognition result of the user's own vehicle position recognition unit 82. For example, the action planning unit 86 generates a local map (dynamic map) which includes static information and dynamic information around the periphery of the user's own vehicle 120. In addition, the action planning unit 86 makes a judgment concerning optimal actions based on the local map and the state (travel speed, steering angle, travel position) of the user's own vehicle 120, and determines the travel speed and a travel trajectory in order to realize such actions.

The vehicle control unit 88 performs a travel control in relation to the automatic control in accordance with the action plan. For example, the vehicle control unit 88 calculates an acceleration or deceleration for enabling the user's own vehicle 120 to travel at the travel speed requested by the action planning unit 86. Further, the vehicle control unit 88 calculates a steering angle for enabling the user's own vehicle 120 to travel along the travel trajectory requested by the action planning unit 86. The vehicle control unit 88 outputs instruction information (driving instructions, braking instructions, steering instructions) in relation to the automatic control to the driving device 28, the braking device 30, and the steering device 32. In the case that a notification is generated in the action plan, the notification control unit 90 outputs instruction information (notification instructions) to the HMI 34.

[2. Driving Modes]

The driving modes are set according to a so-called automated driving level. For example, in the automated driving levels, there are included a Level 0 (L0), a Level 1 (L1), a Level 2A (L2A), a Level 2B (L2B), and a Level 3 (L3). Definitions for the respective levels are as follows. It should be noted that, in the following descriptions, ACC refers to an Adaptive Cruise Control, and LKAS refers to a Lane Keeping Assist System.

L0: Driving assistance is substantially not provided.

L1: As the driving assistance, either one of an ACC or an LKAS is executed.

L2A: As the driving assistance, both the ACC and the LKAS are executed.

L2B: As the driving assistance, both the ACC and the LKAS are executed, and further, the driver is not required to grip the steering wheel 64.

L3: The responsibility of the driver in relation to performing driving operations is alleviated or eased more so than in L2B.

The degree of automation increases in the order of L0, L1, L2A, L2B, and L3. In the present embodiment, L2A is referred to as a first mode, and L2B is referred to as a second mode.

Further, the vehicle control device 10 also carries out an automated lane change, or a so-called automatic lane change. Hereinafter, in order to facilitate explanation, the automatic lane change will be referred to as an ALC.

[3. Outline of the Present Embodiment]

Figure 3:
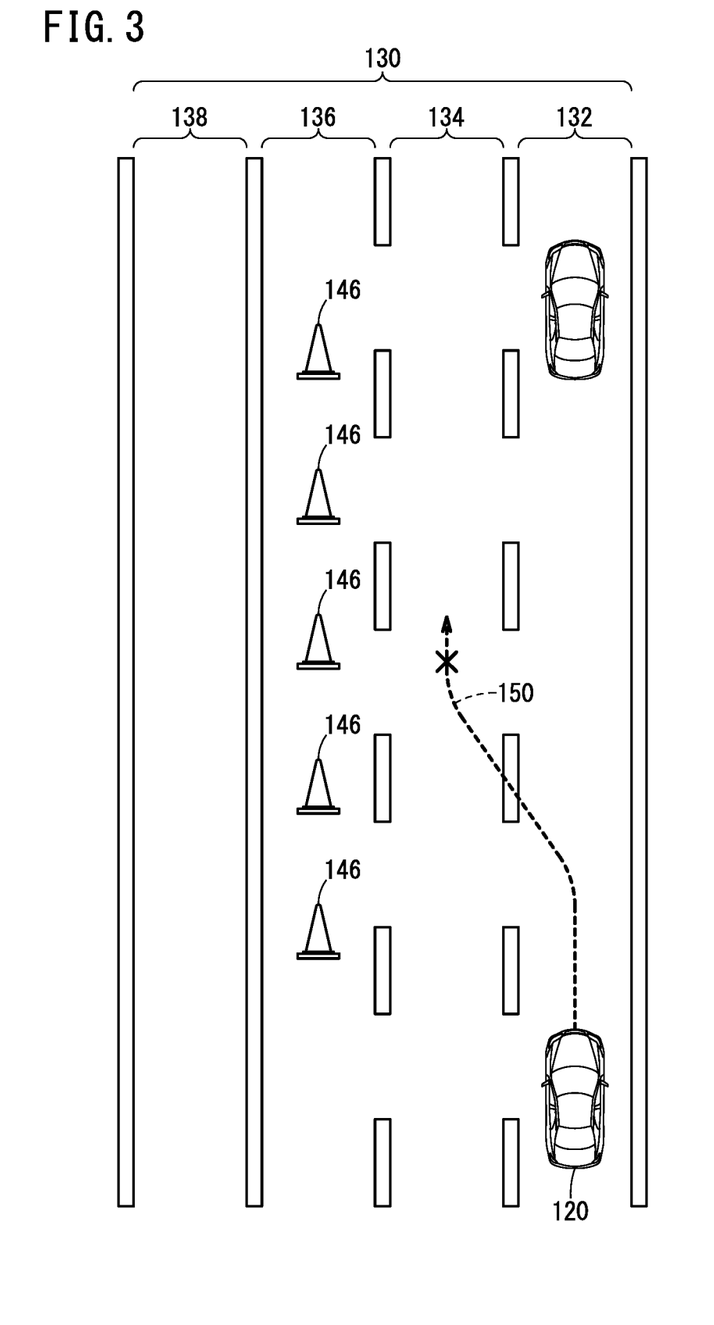
FIG. 3 is a diagram showing a situation assumed in the present embodiment.

An outline of the present embodiment will be described with reference to FIG. 3. On the road 130 shown in FIG. 3, a first lane 132, a second lane 134, a third lane 136, and a road shoulder 138 are aligned in rows alongside and adjacent to each other in that order from one side (the right side shown in FIG. 3, etc.) toward the other side (the left side shown in FIG. 3, etc.). Further, the third lane 136 need not necessarily exist, and the road shoulder 138 may be located at the position thereof.

In the present embodiment, a situation is assumed in which the user's own vehicle 120 travels in the first lane 132, and furthermore executes the ALC from the first lane 132 to the second lane 134. As shown in FIG. 3, in the case that a traffic regulating object, for example, such as pylons 146 or smoke candles or the like, is placed in the third lane 136 (or on the road shoulder 138 instead of the third lane 136), the lane change control unit 92 restricts the ALC from being made. Restriction of the ALC implies cancellation of the ALC. As shown in FIG. 3, in the case that the pylons 146 are not placed in the third lane 136, the lane change control unit 92 generates an ALC trajectory 150 and executes the ALC. On the other hand, in the case that the pylons 146 are placed in the third lane 136, the lane change control unit 92 cancels the ALC (marked with an X in FIG. 3).

[4. Process Performed by the Vehicle Control Device 10]

[4.1. Main Process]

Figure 4:
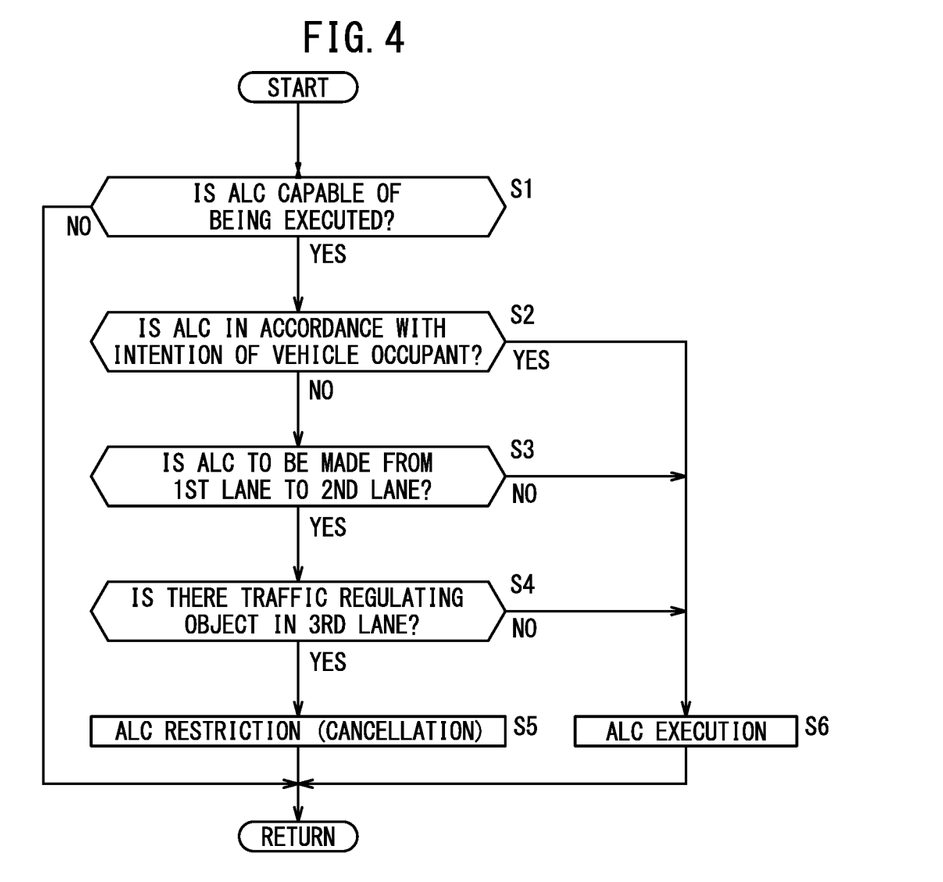
FIG. 4 is a flowchart of a main process.

A description will be given with reference to FIG. 4 of a main process performed by the vehicle control device 10. The main process shown in FIG. 4 is executed in predetermined time intervals, in a state in which at least a driving assist function in relation to making the ALC is operating. Moreover, the input device group (the external environment sensors 14, the navigation device 16, the positioning device 18, the receiving device 20, the vehicle body behavior sensors 22, the operation sensors 24, and the vehicle occupant sensors 26) acquires various information at an appropriate timing, and outputs the acquired information to the main control device 12.

In step S1, the action planning unit 86 determines whether or not the ALC is capable of being executed. For example, the action planning unit 86 makes a determination to the effect that the ALC can be executed, in the case it is judged that the ALC is necessary in order to reach the destination, and the environment is such that the ALC can be executed. The environment in which the ALC can be executed is, for example, a situation in which another vehicle 122 is not recognized to be present in the second lane 134. Further, in the case that the lever sensor 56 detects an operation of the turn signal lever 58 toward the side of the second lane 134, and in the case that the environment is such that the ALC can be executed, the action planning unit 86 makes a determination to the effect that the ALC is capable of being executed. In the case that the ALC is capable of being executed (step S1: YES), the process transitions to step S2. On the other hand, in the case that the ALC is not capable of being executed (step S1: NO), one cycle of the main process comes to an end.

In step S2, the action planning unit 86 determines whether or not the ALC is in accordance with the intention of the driver. In the case that the ALC is not in accordance with the intention of the driver (step S2: NO), or stated otherwise, in the case that the ALC is to be executed regardless of the intention of the driver, the process transitions to step S3. On the other hand, in the case that the ALC is in accordance with the intention of the driver (step S2: YES), the process transitions to step S6.

In step S3, the action planning unit 86 determines whether or not an ALC is to be made from the first lane 132 to the second lane 134. In the case of the ALC being made from the first lane 132 to the second lane 134 (step S3: YES), the process transitions to step S4. In the case of the ALC not being made from the first lane 132 to the second lane 134 (step S3: NO), the process transitions to step S6.

In step S4, based on the recognition result of the external environment recognition unit 80, the action planning unit 86 determines whether or not there is a traffic regulating object in the third lane 136. For example, the external environment recognition unit 80 recognizes the pylons 146 based on height, pattern, and color information. Furthermore, in the case that the external environment recognition unit 80 recognizes a plurality (a predetermined number) of the pylons 146, which are arranged at regular intervals along the direction in which the third lane 136 extends, the action planning unit 86 makes a determination to the effect that a traffic regulating object is present in the third lane 136. Stated otherwise, in the case that the external environment recognition unit 80 recognizes less than a predetermined number of the pylons 146, the action planning unit 86 makes a determination to the effect that a traffic regulating object is not present in the third lane 136. In the case of a traffic regulating object being present in the third lane 136 (step S4: YES), the process transitions to step S5. On the other hand, in the case of a traffic regulating object not being present in the third lane 136 (step S4: NO), the process transitions to step S6.

In step S5, the vehicle control unit 88 restricts the ALC, which in this instance, implies cancellation of the ALC. When the process of step S5 is completed, one cycle of the main process comes to an end.

In step S6, the vehicle control unit 88 executes the ALC. When the process of step S6 is completed, the one cycle of the main process comes to an end.

[4.2. First Process After Cancellation of ALC]

Figure 5:
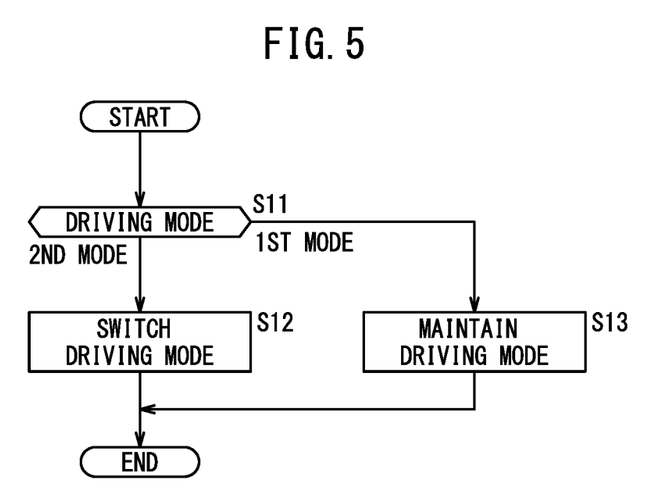
FIG. 5 is a flowchart of a first process executed after cancellation of an ALC (automatic lane change)

Together with the process of step S5 of the main process, the vehicle control device 10 may perform a first process as shown in FIG. 5.

In step S11, the control state setting unit 76 determines whether the driving mode which is set at the present time is the first mode or the second mode. In the case that the driving mode is the second mode, and more specifically, in the case that the driving mode is one in which gripping of the steering wheel 64 is not required (step S11: second mode), the process transitions to step S12. On the other hand, in the case that the driving mode is the first mode, and more specifically, in the case that the driving mode is one in which gripping of the steering wheel 64 is required (step S11: first mode), the process transitions to step S13.

In step S12, the control state setting unit 76 switches the driving mode from the second mode to the first mode. When step S12 is completed, the first process is brought to an end.

In step S13, the control state setting unit 76 maintains the driving mode in the first mode. When step S13 is completed, the first process is brought to an end.

[4.3. Second Process After Cancellation of ALC]

Figure 6:
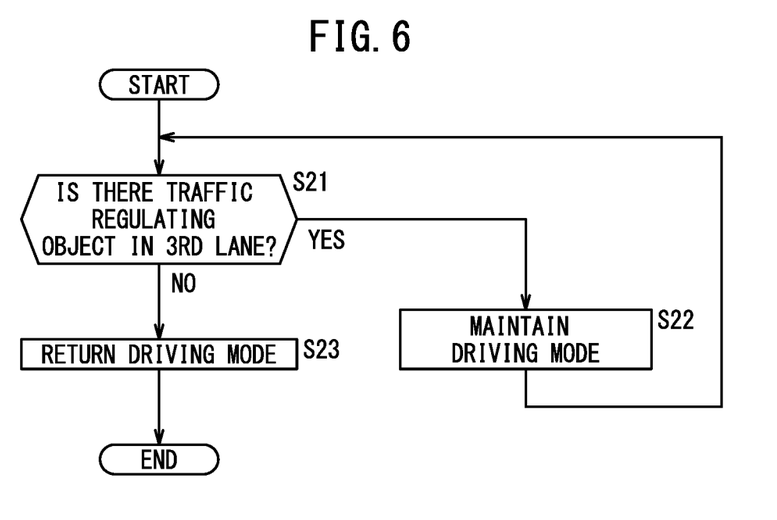
FIG. 6 is a flowchart of a second process executed after cancellation of the ALC.

In the case that, in the first process shown in FIG. 5, the vehicle control device 10 has switched the driving mode from the second mode to the first mode (step S12), thereafter, the second process shown in FIG. 6 may be performed.

In step S21, based on the recognition result of the external environment recognition unit 80, the control state setting unit 76 determines whether or not there is a traffic regulating object in the third lane 136 (or on the road shoulder 138 instead of the third lane 136). For example, in the case that the external environment recognition unit 80 does not recognize a traffic regulating object in the third lane 136 over a predetermined time period or greater, the control state setting unit 76 determines that a traffic regulating object is not present in the third lane 136. In the case of a traffic regulating object being present in the third lane 136 (step S21: YES), and more specifically, in the case that the user's own vehicle 120 is traveling in a section where the pylons 146 or the like are installed, the process transitions to step S22. On the other hand, in the case of a traffic regulating object not being present in the third lane 136 (step S21: NO), and more specifically, in the case that the user's own vehicle 120 has passed by the section where the pylons 146 or the like are installed, the process transitions to step S23.

In step S22, the control state setting unit 76 maintains the driving mode. At this time, the driving mode is the first mode. When the process of step S22 is completed, the process returns to step S21.

In step S23, the notification control unit 90 outputs a notification instruction to the HMI 34. In response to the notification instruction, the HMI 34 prompts the driver to grip the steering wheel 64. The control state setting unit 76, based on an output from the vehicle occupant sensors 26, confirms whether or not the steering wheel 64 has been gripped by the driver. In addition, in the case that gripping thereof is confirmed, the control state setting unit 76 returns the driving mode from the first mode to the second mode. When step S23 is completed, the second process is brought to an end. On the other hand, in the case that gripping thereof cannot be confirmed, the control state setting unit 76 switches the driving mode to another mode with a lower degree of automation.

Moreover, during the second process, even if the mode selection switch 54 has output selection information to switch the driving mode to the second mode, the control state setting unit 76 does not carry out such switching to the second mode.

[5. Technical Concepts Obtained from the Embodiments]

A description will be given below concerning technical concepts that can be grasped from the above-described embodiments and the modified examples.

The one aspect of the present invention is characterized by the vehicle control device 10, comprising:

the external environment recognition unit 80 that recognizes the situation of the surrounding periphery of the user's own vehicle 120; and the lane change control unit 92 that executes the automatic lane change by controlling the travel speed and the steering of the user's own vehicle 120, based on the recognition result of the external environment recognition unit 80;

wherein, on the road 130 on which the first lane 132, the second lane 134, and the third lane 136 or the road shoulder 138 are adjacent to each other, the automatic lane change is executed from the first lane 132 to the second lane 134; and in the case that the traffic regulating object (the pylons 146 or the like) that regulates the passage of traffic is placed in the third lane 136 or on the road shoulder 138, and the traffic regulating object is recognized by the external environment recognition unit 80, the lane change control unit 92 restricts the automatic lane change.

In the above-described configuration, when the traffic regulating object is placed inside the third lane 136 or on the road shoulder 138, the automatic lane change from the first lane 132 to the second lane 134 is restricted. In this case, even if, in addition to being restricted in the third lane 136 or on the road shoulder 138 in front of the user's own vehicle 120, the passage of traffic in the second lane 134 is restricted, there is no need for the user's own vehicle 120 which is traveling in the first lane 132 to make a lane change. Therefore, the driver can ride in the vehicle without worrying over whether or not it will be possible to make another lane change again, which becomes necessary after having made such an initial lane change. In this manner, it is possible to select an appropriate lane in a situation in which the traffic regulating object has been placed.

In the one aspect of the present invention, the automatic lane change may include:

the first lane change which is executed regardless of the intention of the driver; and the second lane change which is executed in accordance with the intention of the driver, wherein, even in the case that the external environment recognition unit 80 recognizes the traffic regulating object (the pylons 146 or the like), if the automatic lane change is the second lane change, the lane change control unit 92 may execute the second lane change.

In the above-described configuration, the automatic lane change which is executed in accordance with the intention of the driver is not restricted. Therefore, according to the above-described configuration, it is possible for the user's own vehicle 120 to be made to travel in accordance with the intention of the driver.

In the one aspect of the present invention, there may further be provided:

the control state setting unit 76 that selects and sets, from among the plurality of driving modes, the state of automation of control of the travel speed or the steering of the user's own vehicle 120, wherein, as the driving modes, there are the first mode, and the second mode in which the degree of automation is higher than in the first mode, and in the case that the external environment recognition unit 80 recognizes the traffic regulating object (the pylons 146 or the like) in a state in which the second mode is set by the control state setting unit 76, the control state setting unit 76 may switch the driving mode from the second mode to the first mode.

In accordance with the above-described configuration, it is possible for the user's own vehicle 120 to be made to travel in a driving mode that is suited to the situation.

In the one aspect of the present invention, in the case that the external environment recognition unit 80 does not recognize the traffic regulating object (the pylons 146 or the like) after the driving mode has been switched from the second mode to the first mode, the control state setting unit 76 may return the driving mode from the first mode to the second mode.

In accordance with the above-described configuration, it is possible for the vehicle to be made to travel in a driving mode that is suited to the situation.

In the one aspect of the present invention, in the case that the external environment recognition unit 80 recognizes the traffic regulating object (the pylons 146 or the like) in a state in which the control state setting unit 76 sets the first mode, the control state setting unit 76 need not necessarily switch the driving mode from the first mode to the second mode.

In the one aspect of the present invention, the first mode may be a driving mode in which gripping of the steering wheel 64 is required; and the second mode may be a driving mode in which gripping of the steering wheel 64 is not required.

In the one aspect of the present invention, the traffic regulating object may be a plurality of the pylons 146 which are arranged at regular intervals along the direction in which the road 130 extends.

In the one aspect of the present invention, the external environment recognition unit 80 may recognize the pylons 146 based on height, pattern, and color information.

The other aspect of the present invention is characterized by the vehicle control method, comprising:

the external environment recognition step of recognizing the situation of the surrounding periphery of the user's own vehicle 120; and the lane change control step of executing the automatic lane change by controlling the travel speed and the steering of the user's own vehicle 120, based on the recognition result of the external environment recognition step;

wherein, on the road 130 on which the first lane 132, the second lane 134, and the third lane 136 or the road shoulder 138 are adjacent to each other, the automatic lane change is executed from the first lane 132 to the second lane 134; and in the case that the traffic regulating object (the pylons 146 or the like) that regulates the passage of traffic is placed in the third lane 136 or on the road shoulder 138, and the traffic regulating object is recognized in the external environment recognition step, in the lane change control step, the automatic lane change is restricted.

The vehicle control device and the vehicle control method according to the present invention are not limited to the embodiments described above, and it is a matter of course that various modified or additional configurations could be adopted therein without deviating from the essence and gist of the present invention.

What is claimed is:

1. A vehicle control device, comprising:
an external environment recognition unit that recognizes a situation of a surrounding periphery of a user's own vehicle;

a lane change control unit that executes an automatic lane change by controlling a travel speed and steering of the user's own vehicle, based on a recognition result of the external environment recognition unit, wherein on a road on which a first lane and a second lane are adjacent to each other, the second lane and a third lane or a road shoulder are adjacent to each other, and the first lane and the third lane or the road shoulder are positioned on opposite sides of the second lane, the vehicle control device executes the automatic lane change from the first lane to the second lane; and in a case that a pylon or a smoke candle that regulates passage of traffic is placed in the third lane or on the road shoulder and the external environment recognition unit recognizes the pylon or the smoke candle, the lane change control unit cancels the automatic lane change from the first lane to the second lane.

2. The vehicle control device according to claim 1, wherein the automatic lane change includes:

a first lane change which is executed regardless of an intention of a driver; and a second lane change in which lane change is executed in accordance with the intention of the driver of the user's own vehicle, and even in the case that the external environment recognition unit recognizes the pylon or the smoke candle is recognized, if the automatic lane change is the second lane change, the lane change control unit executes the second lane change.

3. The vehicle control device according to claim 1, further comprising a control state setting unit that selects and sets, from among a plurality of driving modes, a state of automation of control of the travel speed or the steering of the user's own vehicle, wherein the plurality of driving modes include a first mode in which gripping of a steering wheel is required, and a second mode in which gripping of the steering wheel is not required, and wherein in a case that the external environment recognition unit recognizes the pylon or the smoke candle in a state in which the control state setting unit sets the second mode, the control state setting unit switches the driving mode from the second mode to a first mode.

4. The vehicle control device according to claim 3, wherein in a case that the external environment recognition unit no longer recognizes the pylon or the smoke candle after the driving mode has been switched from the second mode to the first mode, the control state setting unit returns the driving mode from the first mode to the second mode.

5. The vehicle control device according to claim 3, wherein, in a case that the external environment recognition unit recognizes the pylon or the smoke candle in a state in which the control state setting unit sets the first mode, the control state setting unit does not switch the driving mode from the first mode to the second mode.

6. The vehicle control device according to claim 1, wherein the pylon or the smoke candle is provided in plural, and the plurality of pylons or smoke candles are arranged at regular intervals along a direction in which the road extends.

7. The vehicle control device according to claim 6, wherein the external environment recognition unit recognizes the pylons based on height, pattern, and color information.

8. A vehicle control method, comprising:

an external environment recognition step of recognizing a situation of a surrounding periphery of a user's own vehicle;

a lane change control step of executing an automatic lane change by controlling a travel speed and steering of the user's own vehicle, based on a recognition result in the external environment recognition step, wherein on a road on which a first lane and a second lane are adjacent to each other, the second lane and a third lane or a road shoulder are adjacent to each other, and the first lane and the third lane or the road shoulder are positioned on opposite sides of the second lane, the vehicle control method comprises executing the automatic lane change from the first lane to the second lane; and in a case that a pylon or a smoke candle that regulates passage of traffic is placed in the third lane or on the road shoulder, and the pylon or a smoke candle is recognized in the external environment recognition step, canceling the automatic lane change from the first lane to the second lane in the lane change control step.

9. A vehicle control device, comprising:

an external environment recognition unit that recognizes a situation of a surrounding periphery of a user's own vehicle;

a lane change control unit that executes an automatic lane change by controlling a travel speed and steering of the user's own vehicle, based on a recognition result of the external environment recognition unit, wherein on a road on which a first lane and a second lane are adjacent to each other, the second lane and a third lane or a road shoulder are adjacent to each other, and the first lane and the third lane or the road shoulder are positioned on opposite sides of the second lane, the lane change control unit cancels the automatic lane change from the first lane to the second lane in a case that a pylon or a smoke candle that regulates passage of traffic is placed in the third lane or on the road shoulder and the external environment recognition unit recognizes the pylon or the smoke candle: and the lane change control unit is capable of executing the automatic lane change other than the automatic lane change from the first lane to the second lane regardless of whether the external environment recognition unit recognizes the pylon or the smoke candle.

10. The vehicle control device according to claim 9, wherein the automatic lane change includes:

a first lane change which is executed regardless of an intention of a driver; and a second lane change in which lane change is executed in accordance with the intention of the driver of the user's own vehicle, and even in the case that the external environment recognition unit recognizes the pylon or the smoke candle is recognized, if the automatic lane change is the second lane change, the lane change control unit executes the second lane change.

11. The vehicle control device according to claim 9, further comprising a control state setting unit that selects and sets, from among a plurality of driving modes, a state of automation of control of the travel speed or the steering of the user's own vehicle, wherein the plurality of driving modes include a first mode in which gripping of a steering wheel is required, and a second mode in which gripping of the steering wheel is not required, and wherein in a case that the external environment recognition unit recognizes the pylon or the smoke candle in a state in which the control state setting unit sets the second mode, the control state setting unit switches the driving mode from the second mode to a first mode.

12. The vehicle control device according to claim 11, wherein
in a case that the external environment recognition unit no longer recognizes the pylon or the smoke candle after the driving mode has been switched from the second mode to the first mode, the control state setting unit returns the driving mode from the first mode to the second mode.

13. The vehicle control device according to claim 11, wherein, in a case that the external environment recognition unit recognizes the pylon or the smoke candle in a state in which the control state setting unit sets the first mode, the control state setting unit does not switch the driving mode from the first mode to the second mode.

14. The vehicle control device according to claim 9, wherein the pylon or the smoke candle is provided in plural, and the plurality of pylons or smoke candles are arranged at regular intervals along a direction in which the road extends.

15. The vehicle control device according to claim 14, wherein the external environment recognition unit recognizes the pylons based on height, pattern, and color information.

\* \* \* \* \*